(12) United States Patent
Brady et al.

(10) Patent No.: US 11,219,255 B2
(45) Date of Patent: Jan. 11, 2022

(54) SELF-CONTAINED, MOBILE BREATHING APPARATUS OR APPLIANCE THAT SUPPLIES PATHOGEN AND ENDOTOXIN FREE, RHYTHMICALLY BREATHABLE AIR TO THE WEARER OR TREATED SPACE THROUGH ACTIVE, CONTINUOUS BIO-DEACTIVATION AND DESTRUCTION OF BACTERIA, FUNGI, VIRAL AND ALLERGENIC/ANTIGENIC MATTER SAFELY WHEN USING BENIGN, HOUSEHOLD, RECHARGEABLE FILTRATION MEDIA

(71) Applicants: Terry Earl Brady, The Valley (AI); Robert Joseph Barry, Port Murray, NJ (US); Anthony Lee Dellinger, Brown Summit, NC (US)

(72) Inventors: Terry Earl Brady, The Valley (AI); Robert Joseph Barry, Port Murray, NJ (US); Anthony Lee Dellinger, Brown Summit, NC (US)

( * ) Notice: Subject to any disclaimer, the term of this patent is extended or adjusted under 35 U.S.C. 154(b) by 0 days.

(21) Appl. No.: 16/897,655

(22) Filed: Jun. 10, 2020

(65) Prior Publication Data
US 2021/0315297 A1    Oct. 14, 2021

Related U.S. Application Data

(60) Provisional application No. 63/007,154, filed on Apr. 8, 2020.

(51) Int. Cl.
*A62B 18/00* (2006.01)
*A41D 13/11* (2006.01)
(Continued)

(52) U.S. Cl.
CPC ............ *A41D 13/1192* (2013.01); *A62B 9/04* (2013.01); *A62B 18/025* (2013.01); *A62B 18/10* (2013.01); *B01D 46/10* (2013.01)

(58) Field of Classification Search
CPC .. A62B 18/10; A62B 7/10; A62B 7/12; A62B 7/14; A62B 23/00–06;
(Continued)

(56) References Cited

U.S. PATENT DOCUMENTS 1,319,763 A    10/1919  Drew
2,709,577 A *  5/1955  Pohndorf ............ A61M 16/107
                                              261/2
(Continued)

*Primary Examiner* — Samchuan C Yao
*Assistant Examiner* — Ned T Heffner

(57) ABSTRACT

The present invention relates to a protective face mask and filtration article, a method for using a protective face mask and filtration article, and a design for manufacturing. In particular, the invention relates to a self-contained, mobile, battery-powered bioactive and filtering breathing appliance that provides broad spectrum antimicrobial and allergic protection via an atomized biocidal agent steam/vapor and a torturous hydrophilic filtration article that sterilizes incoming air and captures debris. To this end, antimicrobial activity and filtration functions leverage a redundancy of means/methods comprised of antimicrobial hydrogen peroxide liquid/vapor/steam and an iodized salt containing hydrophilic filtration article. The present invention is a wearable apparatus that sterilizes incoming air by capturing, neutralizing and destroying airborne pathogens and other particulate matter and pumps sterilized oxygen/air for natural, unlabored breathing by the wearer. The present invention further relates to a production method thereof.

4 Claims, 10 Drawing Sheets

(51) Int. Cl.
*A62B 18/10* (2006.01)
*A62B 9/04* (2006.01)
*B01D 46/10* (2006.01)
*A62B 18/02* (2006.01)

(58) Field of Classification Search
CPC .............. A61M 16/00; A61M 16/06; A61M 16/10–1096; A61M 16/16–168
See application file for complete search history.

(56) References Cited

U.S. PATENT DOCUMENTS

| | | |
|---|---|---|
| 3,333,585 A | 8/1967 | Barghini et al. |
| 3,710,948 A | 1/1973 | Sexton et al. |
| 3,779,244 A | 12/1973 | Weeks et al. |
| 3,802,429 A | 4/1974 | Bird |
| 4,197,100 A | 4/1980 | Hausheer |
| 4,215,682 A | 8/1980 | Kubik |
| 4,536,440 A | 8/1985 | Berg |
| 4,560,883 A | 12/1985 | Kerschgens |
| 4,685,456 A * | 8/1987 | Smart ............... A61M 16/08 128/204.18 |
| 4,729,371 A | 3/1988 | Krueger et al. |
| 4,798,676 A | 1/1989 | Matkovich |
| 4,807,619 A | 2/1989 | Dyrud et al. |
| 4,850,347 A | 7/1989 | Skov |
| 4,873,972 A | 10/1989 | Magidson et al. |
| 4,915,105 A | 4/1990 | Lee |
| 4,961,420 A | 10/1990 | Cappa et al. |
| 5,181,506 A | 1/1993 | Tardiff et al. |
| 5,227,172 A | 7/1993 | Deeds |
| 5,275,154 A | 1/1994 | von Blucher et al. |
| 5,291,881 A | 3/1994 | Drews et al. |
| 5,307,796 A | 5/1994 | Kronzer et al. |
| 5,323,774 A | 6/1994 | Fehlauer |
| 5,492,882 A | 2/1996 | Doughty et al. |
| 5,496,507 A | 3/1996 | Angadjivand et al. |
| 5,509,436 A | 4/1996 | Japuntich et al. |
| 5,525,136 A | 6/1996 | Rosen |
| 5,656,368 A | 8/1997 | Braun et al. |
| 5,747,053 A | 5/1998 | Nashimoto et al. |
| 5,771,885 A | 6/1998 | Putrello |
| 5,782,234 A | 7/1998 | Bates |
| 5,906,677 A | 5/1999 | Dudley |
| 6,036,738 A * | 3/2000 | Shanbrom .......... B01D 46/0028 55/524 |
| 6,057,256 A | 5/2000 | Krueger et al. |
| 6,146,449 A | 11/2000 | Lee et al. |
| 6,233,748 B1 | 5/2001 | Gieger et al. |
| 6,277,178 B1 | 8/2001 | Holmquist-Brown et al. |
| 6,321,915 B1 | 11/2001 | Wilson et al. |
| 6,514,306 B1 | 2/2003 | Rohrbach et al. |
| 6,681,765 B2 | 1/2004 | Wen |
| 6,962,156 B2 | 11/2005 | Michaels |
| 6,971,386 B2 | 12/2005 | Duxbury |
| 7,025,060 B1 | 4/2006 | Nicholson |
| 7,044,993 B1 | 5/2006 | Bolduc |
| 7,188,622 B2 | 3/2007 | Martin et al. |
| 7,614,280 B1 * | 11/2009 | Gardner ................ A62B 27/00 73/38 |
| 7,918,225 B2 | 4/2011 | Dolezal et al. |
| 10,201,198 B2 | 2/2019 | Tong et al. |
| 2004/0261797 A1 * | 12/2004 | White ............... A61M 16/1095 128/206.11 |
| 2006/0096596 A1 * | 5/2006 | Occhialini ........... A61M 16/16 128/204.18 |
| 2006/0191533 A1 | 8/2006 | Brookman |
| 2006/0108042 A1 | 10/2006 | Phifer et al. |
| 2008/0310994 A1 * | 12/2008 | O'Donnell ........ A61M 16/0066 422/4 |
| 2018/0169551 A1 * | 6/2018 | Jaganathan .......... B01D 46/521 |

* cited by examiner

SELF-CONTAINED, MOBILE BREATHING APPARATUS OR APPLIANCE THAT SUPPLIES PATHOGEN AND ENDOTOXIN FREE, RHYTHMICALLY BREATHABLE AIR TO THE WEARER OR TREATED SPACE THROUGH ACTIVE, CONTINUOUS BIO-DEACTIVATION AND DESTRUCTION OF BACTERIA, FUNGI, VIRAL AND ALLERGENIC/ANTIGENIC MATTER SAFELY WHEN USING BENIGN, HOUSEHOLD, RECHARGEABLE FILTRATION MEDIA

CROSS-REFERENCE TO RELATED APPLICATION

This application claims priority to U.S. Provisional Patent Application Ser. No. 63/007,154 filed by Brady, Barry and Dellinger on Apr. 8, 2020, entitled "Self-contained, mobile breathing apparatus that supplies pathogen and endotoxin free breathable air to the wearer through active, continuous bio-deactivation and destruction of bacteria, fungi, viral and allergenic/antigenic matter safely when using benign, household, rechargeable filtration media."

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates generally to a protective face mask or space and filtration article, the use of a protective face mask and filtration article, and a method for manufacturing. In particular, the invention relates to a protective face mask and appliance that sterilizes air, filters or absorbs particulates through capillary or desiccant physics, offers antimicrobial and antigenic protection, and supplies comfortable, rhythmically breathable air to the wearer through the use of bioactive media to prevent pathogenesis through deactivation of infectious and antigenic airborne matter.

Description of the Related Art

Traditional protective face masks block matter from the environment based on porosity and subsequent exclusion. The present invention relates to a protective face mask comprised of a potent broad-spectrum antimicrobial hydrogen peroxide ($H_2O_2$) (or alternative liquid and atomizable sterilant that are safe), atomized vapor, and hydrophilic/crystalline iodized salt (or alternative crystalline halogenated materials) filter article that work in combination to disinfect, sterilize and filter external air for safe and natural breathing by a wearer while the invention is in use. In one preferred embodiment of the present invention, a protective mobile breathing apparatus facial contact mask and air supply/controller unit would sterilize all incoming air from the environment for safe, easy breathing by a wearer. In this embodiment incoming air from the environment is sterilized by passing through a liquid $H_2O_2$ phase and up a tubing material into a highly hydrophilic iodized sodium chloride filtration article prior to inhalation by a wearer or space.

Conventional designs for protective face masks are (1) designed as a barrier or wall that blocks airborne pathogens or allergens from the surrounding environment and (2) prevent potentially harmful exhalations of a wearer from contaminating/tainting the surrounding environment. Fundamentally, current protective face masks present an exclusory interface or boundary, whereby exhalation of a wearer is prevented from entering the environment and environmental air is prevented from entering a wearer. In another preferred embodiment of the present invention the protective mobile breathing apparatus facial contact mask and air supply/controller unit would sterilize incoming environmental air and the exhalant released from a wearer. This would ensure all incoming and outgoing air exchanged by a wearer is sterilized. In an alternative embodiment, exhalation is uncontrolled when air sterilization is performed in a contained space, other than through air volume exchange rate, scaled to need.

Typical surgical or gauze masks are not airtight and inadequately isolate powders, microbes, and/or airborne particles. These mask function as an absorption matrix that partially screens a wearer from an environment and reduces exhalation from a wearer to an environment. An exemplary embodiment includes: U.S. Pat. No. 3,802,429A—Surgical face mask, issued Apr. 9, 1974, to Johnson and Johnson. The purpose of this mask is to prevent potentially contaminated exhalation by medical personnel from contaminating a patient. These surgical masks also provide a protective barrier for medical personnel from bacteria originating from a patient. These masks are limited in effectiveness of filtering pathogens but are considered comfortable to wear and have low air resistance. This invention does not sterilize air, nor does it leverage the hydrophobic or hydrophilic interactions and properties or contain bioactive media. Additionally, high-quality surgical face masks become moist and technically contaminated from exhaled air and cease to function appropriately. Surgeons do not typically wear masks while either sleeping or relaxing.

The N95 respirator (U.S. Pat. No. 3,333,585A—Cold weather face mask, issued Aug. 1, 1967, to 3M Co.) provides more airtightness and coverage compared to the surgical and gauze masks. These respirators work when the wearer exerts more strength to inhale or exhale through the breathing mask. This results in residual carbon dioxide exhalant remaining in the breathing masks and is subsequently inhaled by a wearer who continues breathing arduously to resupply oxygen. The body of the N95 respiratory is comprised of a nonwoven elastic porous fiber fabric (water organic polymer material) with a cup-shaped contour. The filter of the N95 respiratory is comprised of an outer layer of spun-bond polypropylene, middle layers of cellulose/polyester and melt-blown polypropylene filter material and an inner (fourth) layer of spun-bound polypropylene. If worn properly, the N95 mask can form a barrier and help block large-particle droplets, splashes, sprays, or splatter that may contain pathogenic material from reaching mouth and nose of the wearer. This invention does not sterilize air, nor does it leverage the hydrophobic or hydrophilic interactions and properties or contain bioactive media. The N95 respirator mask requires deep, dynamic breathing that potentially overrides filtration pore size, as pathogens have great plasticity and can easily follow moisture through shape change and airstreams. Additionally, the N95 respirator mask disrupts normal breathing and can reduce human fitness in a short period of time of wearing.

Modifications to traditional protective face masks include the addition of features such as ventilators, valves and fans that improve the flow of exhaled gas out of the mask and enhance wearer comfort. These ventilators or valves are typically unilateral and limit the flow of air into the mask via a valve, however exhaled air may pass out of the mask through a valve with the aid of a fan. In the present embodiment air flow into a protective mask is not restricted, rather all incoming air is sterilized, as described in the preferred embodiment, and inhaled by a wearer. A one-way exhaust vent(s) or valve(s) facilitates unlabored breathing by a wearer and exhalant is released from the mask. Typically, the vent(s) or valve(s) of these masks are non-filtered. This design feature enables less flow resistance of the exhaled air and provides greater comfort for a wearer. Exemplary examples include: U.S. Pat. No. 4,873,972A—Disposable filter respirator with inner molded face flange, issued Oct. 17, 1989, to Moldex Metric Inc; U.S. Pat. No. 5,509,436A—Unidirectional fluid valve, issued Apr. 23, 1996, to 3M Co.; and U.S. Pat. No. 7,188,622B2—Filtering face mask that has a resilient seal surface in its exhalation valve, issued Mar. 13, 2007, to 3M Co. In contrast to the present invention, these designs do not sterilize the incoming air or filter the outgoing air. Further, disruption of rhythmic breathing is typical and results in reduced fitness in a user in a short period of time of wearing.

Another class of surgical masks is defined as using a filter network to trap pathogens. Exemplified by U.S. Pat. No. 7,044,993B1—Microbicidal air filter, issued Apr. 23, 1996, to Noveko Inc. The filter system is comprised of fibers that act as an immobilization network with antimicrobial agents incorporated and molecularly bonded to the fibers. The antimicrobial agents described in U.S. Pat. No. 7,044,993B1 include treated polyvinyl chloride (TRICLOSAN™) and benzyl benzoate. Due to safety concerns, the FDA banned the use of TRICLOSAN™ in antibacterial soaps in 2016 and OTC antiseptic products (hand washes and surgical scrubs) in 2017. Benzyl benzoate is largely an insect repellant that has some medical evidence as a topical treatment for scabies. In contrast to the present invention, neither TRICLOSAN™ or benzyl benzoate are used as antimicrobial agents. In further contrast, the proposed invention differs by separating toxicity to a wearer by killing pathogens in two mechanisms: All incoming air must pass through a (1) $H_2O_2$ fluid and (2) an iodized sodium chloride media, of which both antimicrobial agents are fit for human consumption but lethal to pathogens. Furthermore both antimicrobial pathways are well shielded from any contact with a wearer's airway by distance and the hydrophilic properties of the media. Finally, as before and in contrast to U.S. Pat. No. 7,044,993, the proposed invention does not affect rhythmic breathing.

Other protective masks employ filter canisters to trap or immobilize pathogens. Exemplary embodiments includes: U.S. Pat. No. 1,319,763A—Air filter for wall registers, issued Oct. 28, 1919, to Drew; U.S. Pat. No. 3,710,948A—Self-sustaining pocket type filter, issued Jan. 16, 1973, to Sexton; U.S. Pat. No. 3,779,244A—Disposable face respirator, issued Dec. 18, 1973, to Weeks; U.S. Pat. No. 3,802,429A—Surgical face mask, issued Apr. 9, 1974, to Bird; U.S. Pat. No. 4,197,100A—Filtering member for filters, issued Apr. 8, 1980, to Hausheer; U.S. Pat. No. 4,798,676A—Low pressure drop bacterial filter and method, issued Jan. 17, 1989, to Matkovich; U.S. Pat. No. 5,525,136A—Gasketed multi-media air cleaner, issued Jun. 11, 1996, to Rosen; U.S. Pat. No. 5,747,053A—Antiviral filter air cleaner impregnated with tea extract, issued May 5, 1998, to Nashimoto; U.S. Pat. No. 5,906,677A—Electrostatic supercharger screen, issued May 25, 1999, to Dudley; U.S. Pat. No. 6,036,738A—Disinfecting gas filters, issued Mar. 14, 2000, to Shanbrom; U.S. Pat. No. 6,514,306B1—Antimicrobial fibrous media, issued Feb. 4, 2003, to Rohrbach et al.; and U.S. Pat. No. 6,681,765B2—Antiviral and antibacterial respirator mask, issued Jan. 27, 2004, to Sheree H. Wen. In contrast to the present invention, these designs quickly reach a maximum threshold and require removal of the contaminated filter canister, a process which can expose a user to hazardous immobilized pathogens or particulates. Further some of these designs utilize hazardous materials (i.e.: fiberglass). While some of the designs are cleanable and reusable after reaching a threshold, the risk of exposure is notable, but further the effectiveness of the antimicrobial and immobilizing properties of the material is dramatically reduced. The current invention teaches that discernible antipathogenic properties require direct contact with a microbe for inactivation and subsequent destruction of infectious matter. The prior art does not employ demonstrable physics or chemical properties that are destructive to microbes in a safe, household utility for the general population. Further, as with most respirators, normal rhythmic breathing is interrupted with the art described in these patents.

Many commonly used in respirator filters require an electrical charge placed on the microfibers of the filter to improve capture efficiency. Exemplary examples include: U.S. Pat. No. 4,215,682A—Melt-blown fibrous electrets (issued Aug. 5, 1980 to 3M Co); U.S. Pat. No. 5,227,172A—Charged collector apparatus for the production of meltblown electrets (issued Jul. 13, 1993 to Exxon Mobile Chemical Patents Inc); U.S. Pat. No. 5,307,796A—Methods of forming fibrous filtration face masks (issued May 3, 1994 to 3M Co); U.S. Pat. No. 5,496,507A—Method of charging electret filter media (issued Mar. 5, 1996 to 3M Co); U.S. Pat. No. 5,656,368A—Fibrous filtration face mask having corrugated polymeric microfiber filter layer (issued Aug. 12, 1997 to 3M Co); U.S. Pat. No. 4,729,371A—Respirator comprised of blown bicomponent fibers (issued Mar. 8, 1998 to 3M Co); and U.S. Pat. No. 6,057,256A—Web of biocomponent blown fibers (issued May 2, 2000 to 3M Co). Such electrically charged microfibers require a permanently molded layer that provides structural support to retain shape. Examples of patents teaching the use of a structural layer for microfiber support in a respiratory include: U.S. Pat. No. 4,536,440A—Molded fibrous filtration products (issued Aug. 20, 1985 to 3M Co); U.S. Pat. No. 4,807,619A—Resilient shape-retaining fibrous filtration face mask (issued Feb. 28, 1989 to 3M Co); and U.S. Pat. No. 4,850,347A—Face mask (issued Jul. 25, 1989 to Moldex Metric Inc). Each of these filter articles are comprised of electrically charged microfibers and require a separate supporting structure to create the composite article. In contrast to this prior art, the proposed invention leverages hydrophilic interactions of filter bound iodized sodium chloride and does not include as electrostatic associations, charges or modifications to the filter article to improve capture affinity. The current invention teaches that molecular matter is of great variety especially in the viral pathogen category and the matter is neither alive or dead in an airborne or non-hosted state. Atomically, the coronavirus cannot exchange an electron, per se, but is of protein characterization, outwardly, as RNA matter is not easily characterized beyond acidity.

A number of non-mask respirators have been developed to address poor fitting associated with traditional masks (i.e.: facial hair, facial deformities, and/or sensitive skin). One exemplary embodiment includes: U.S. Pat. No. 4,915,105A—Miniature respiratory apparatus (issued Apr. 10, 1990 to Tien-Chu). This invention teaches a respiratory apparatus with a nostril intake manifold connected to two hoses that surround the head of a wearer and join to a single extension tube connected to a filter box that is attached to a wearer's waist, chest or neck. The embodiment of only a nostril intake respiratory was designed to increase a wearer's comfort and enable conversation while wearing the mask, which does not cover the mouth of a wearer. While potential effective against dust particles, the mask provides limited protection from pathogenic material in the environment that can be readily introduced through the oral pathway. In contrast to the above, U.S. Pat. No. 6,971,386B2—Personal respirator (issued Dec. 6, 2005 to Duxbery) introduces a device with a mouthpiece and check valves leading to two tubes that encircle the head of a wearer. A filter cartridge is located on the upper back or neck region of a wearer to minimize the area required for the respiratory in front of a wearer's face. The invention requires nasal clips to seal the nose pathway. Both devices wrap around the head of a wearer, are difficult to manage, and fail to provide comprehensive protection from the environment.

Similar compact respirators, like those above have been taught in U.S. Pat. No. 5,771,885A—Exercise filter (issued Jun. 30, 1998 to Tri-Pact Enterprises Inc); U.S. Pat. No. 5,782,234A—Respiratory breathing filter apparatus and method (issued Jul. 21, 1998 to Bates); and 7,025,060B1—Personal breathing filter (issued Apr. 11, 2006 to Nicholson). These compact respirators are held in the mouth, gripped by the teeth of a wearer and a filter is located directly in front of the mouth of a wearer. While smaller than other respirators, these devices are held in place by the force of a wearer's teeth. Prolonged usage results in jaw fatigue and communication is entirely inhibited while wearing. Additionally, comprehensive protection in these embodiments is lacking as incoming air to the nasal pathway is unprotected.

Nostril plug type filters as described in U.S. Pat. No. 6,962,156B2—Enhanced personal air purifier (issued Nov. 8, 2005 to Breathepure Healthcare LLC) and U.S. Pat. No. 7,918,225B2—Breathing air filtration devices (issued Apr. 5, 2011 to AirWave Inc). This art teaches a respiratory device and filter mechanism that is inserted into the nostrils of a wearer. The devices are single use and do not offer protection for a user when breathing through the mouth.

Powdered air-purifying respirators (PAPRs) continually supply positive air pressure to a protective face mask. PAPRs are typically used in military, industrial or hazardous environments to prevent ambient air from entering a mask, helmet or hood. These devices typically require a powered fan that forces ambient air through a filter(s) for delivery to an inlet in a respirator mask, helmet or hood. The component parts (fan, filter and power supply) can be mounted to a mask, on a belt, or on a backpack and connect to a face mask through a hose. Exemplary embodiments include: U.S. Pat. No 2006/0191533A1—Powered air purifying respirator system and breathing apparatus (published Aug. 31, 2006 by Interspiro Inc) and International Pat. No. WO2006/108042A1—Portable air-purifying system utilizing enclosed filters (published Oct. 12, 2006 by Phifer et al.). Both devices require an additional compressed air canister that is worn on the back of a user and air is recycled rather than sterilized.

Airborne bacteria and viruses cause infection and disease through inhalation. Previous inventions have described protective breathing masks that filter or adsorb contaminants such as pathogens. One such embodiment is described in U.S. Pat. No. 6,277,178B1—Respirator and filter cartridge (issued Aug. 21, 2001 to 3M Co). The respirator includes an absorbent filter cartridge containing an activated carbon medium that adsorbs airborne contaminants but provides no antimicrobial claims. Similarly, U.S. Pat. No. H1360H—Lightweight protective gas mask and hood (issued Oct. 4, 1994 to U.S. Secretary of Army) teaches a protective mask comprised of a face piece, a headpiece, and a bib formed from an elastic impervious material. The filter article is comprised of flexible charcoal that absorbs airborne contaminants but provides no antimicrobial mode of action.

U.S. Pat. No. 5,492,882A—Chromium-free impregnated activated universal respirator carbon for adsorption of toxic gases and/or vapors in industrial applications (issued Feb. 20, 1996 to Calgon Carbon Corp) teaches an activated carbon adsorbent impregnated therein such compounds as sulfuric acid or one of its salts, molybdenum compounds, cooper compounds and zinc compounds. Similarly, U.S. Pat. No. 6,321,915B1—High performance filters based on inorganic fibers and inorganic fiber whiskers (issued Nov. 27, 2001 to Hitco Carbon Composites Inc) comprised of a blend of carbon or ceramic fibers and inorganic fiber whiskers generally having a diameter of from about 0.03 to about 5 microns. Additional embodiments include: U.S. Pat. No. 4,560,883A—Method of and device for ultraviolet irradiation (issued Dec. 24, 1985 to Kerschgens); U.S. Pat. No. 4,961,420A—Gas mask for operation in contaminated areas (issued Oct. 9, 1990 to Cappa et al.); U.S. Pat. No. 5,181,506A—Multilayer protective gas mask (issued Jan. 26, 1993 to the U.S. Secretary of Army); U.S. Pat. No. 5,275,154A—Activated charcoal filter layer for gas masks (issued Jan. 4, 1994 to Mbh Filtration & Co KG GmbH); U.S. Pat. No. 5,291,881A—Air cleaning cartridge for a gas mask and breathing equipment with an insert (issued Mar. 8, 1994 to Draegerwerk AG and Co KGaA); U.S. Pat. No. 5,323,774A—Breathing mask with an indicator signaling penetration of a toxic substance into the mask (issued Jun. 28, 1994 to Draegerwerk AG and Co KGaA); U.S. Pat. No. 6,146,449A—Reusable canister for a gas mask (issued Nov. 14, 2000 to Korea Atomic Energy Research Institute); and U.S. Pat. No. 6,233,748B1—Environmental protection system (issued May 22, 2001 to Integrated Medical Systems Inc). In contrast to the present invention, each of the aforementioned patents do not appear to provide protection against bacterial, fungal or viral contaminants.

U.S. Pat. No. 10,201,198B2—Protective masks with coating comprising different electrospun fibers interweaved with each other, formulations forming the same, and method of producing thereof (issued Feb. 12, 2019 to Profit Royal Pharmaceutical Ltd) describes an ultrafine fibrous coating comprised of partially gelled submicron fibers interweaved with nanofibers and an encapsulated, surface-attached, blended, physically trapped and/or chemically linked biocide. Said biocide includes silver, copper, copper oxide, titanium oxide, zinc oxide, iodine, TRICLOSAN™ and chlorhexidine. The patent claims 99% reduction in 5 minutes for *Pseudomonas aeruginosa* (gram-negative bacteria) and *Staphylococcus aureus* (gram-positive bacteria). The proposed protective mask resembles the N95 respirator (U.S. Pat. No. 3,333,585A) described above.

As is described in the previous art, all of the proposed protective face masks suffer from some degree by deficiencies. Shortcomings of protective face masks described in the prior art include: Traditional surgical masks fail to provide adequate filtration to safeguard a wearer. These masks act as a barrier absent robust antimicrobial capacity, creating a reservoir for pathogenic material. These masks are typically single use and wasteful. Furthermore, their ability to filter out contaminants at a certain range of sizes is problematic. Contaminants can bypass filtering materials because air can traverse the gap between a mask and a wearer's face. Respirators, exemplified by the N95, offer greater protection because of their airtight design and fit. However, breathability of such respirators is reduced, resulting in unnatural and laboring breathing and culminating in low user compliance. Like traditional masks, most respirators do not possess antibacterial function. An urgent and unmet need exists for a highly breathable, protective and functional (portable and comfortable) protective mask capable of comprehensive destruction and capture of pathogenic or allergenic material. Additionally, as designed, these existing masks do not shield or protect a user's eyes from incursion of ambient airborne pathogenic particles.

Appropriately, there is a considerable need for an improved antimicrobial protective face mask or apparatus that is effective, safe, comfortable, durable, easy to use, and affordable to produce. In that context, rhythmic breathing is necessary for biologic normalcy and optimal functionality of all organs in the body. Labored or abnormal breathing results in biochemical dysfunction leading to ineffectiveness of activity and human fitness. This art is the only invention that addresses mobility and normal breathing. Air is supplied to the inhalation and exhalation demands by 100% excess air that is sterile. As such, this appliance and face mask could be comfortably worn for oceanic air travel and close proximity manufacturing and r long shift hours without breath exhaustion.

BRIEF SUMMARY OF THE INVENTION

There is a substantial need to sterilize the air when combating environmental pathogenic matter in hospitals, factories, industrial warehouses facilities, manufacturing facilities, food production and packaging plants, schools and universities, animal husbandry operations, or any densely populated space; especially during a viral pandemic. Protective face masks must be mobile, agile in movement, comfortable, safe and provide robust and broad-spectrum protection.

The proposed invention is a wearable protective breathing apparatus facial contact mask and air supply/controller unit that sterilizes the air by disintegrating airborne pathogens and other particulate matter aggressively through redundancy of means, methods. The invention (a wearable apparatus) is easily donned and capable of quick removal. Protective facial masks are designed to be worn by both an infected person (transmission of infection prevention) and by a non-infected person (infection prevention). Current face masks designed to actively kill or inactivate pathogens have only one single active anti-pathogen layer which can be either hydrophilic or hydrophobic and consist of any compounds or materials aimed to actively kill or inactivate a range of pathogens harmful to human health, that includes viruses, bacteria, fungus, bacterial spores and fungal spores. The same shortcomings are equally apparent with respect to environmental air handling systems.

To overcome the drawbacks of incorporating only one single active anti-pathogen layer, two or more layers, or permutations of hydrophilic and/or hydrophobic mask layers, each optionally incorporating on or more anti-viral, anti-bacterial, anti-fungal and anti-spore (anti-pathogen) substances, are incorporated into a breathing apparatus facial contact mask and air supply/controller unit. During wear, various liquid/aerosol volumes containing pathogens will be challenged by a variety of liquid/aerosol dynamics. Liquid and aerosol challenges containing infectious pathogens will exhibit variability in total volume, velocity of challenge, droplet size of challenge, range of exposure time relative to challenge, rate of absorption into filter article layers, and rate of draw/inhalation by a wearer while in use. As such, one active mask layer is not sufficiently capable of maintaining anti-pathogen performance, nor inactivating a spectrum of infectious pathogens over a short period of time and an extended duration. Broad spectrum inactivation of pathogens and persistent anti-pathogen activity will be exhibited with the inclusion of one or more additional inner active anti-pathogen layers, with each active agent having a different mechanism by which pathogens are inactivated.

Many infectious human diseases are caused by pathogens such as bacteria, fungi and viruses that enter the human via inhalation and are released to the environment via exhalation. These diseases include, but are not limited to: *Aspergillus* spp; *Bacillus anthracis; Bordetella pertussis; Corynebacterium diphtheriae; Haemophilus influenzae* Type B; Human adenovirus A-C; Human coronavirus (SARS); Human enterovirus; Human Para-influenza virus; Human respiratory syncytial virus; Human rhinovirus A-B; Influenza A virus; Influenza B-C virus; Mumps virus; *Mycobacterium tuberculosis; Mycoplasma pneumoniae; Neisseria meningitidis*; Parvovirus B19; Rubeola virus; Rubella virus; *Streptococcus pyogenes/pneumoniae*; Variola virus; and Varicella-zoster virus.

The present invention provides a protective breathing apparatus facial contact mask and air supply/controller unit that has redundant, comprehensive and broad-spectrum, and bioactive pathogen destruction efficiency with very low air resistance. In this invention, an ambient supply of air pumped into an air supply/controller unit is controllable by a mechanical pumping means (using a battery) that can be comfortably affixed to a wearer (back, waist, belt, etc.) or environmental air handling system. External, environmental air is pumped into an air supply/controller unit and forced through a tubing that terminates into a bulb/globe (baffled bubbler) containing $H_2O_2$ solution. An aeration technique breaks the air molecules into tiny, unstable bubbles that contact and interact with the $H_2O_2$ liquid. $H_2O_2$ behaves as both a sterilant with broad-spectrum anti-pathogenic properties and as a wetting agent to hydrophilic molecules. A combination of the aeration mechanics and intense mixing inside of a vacuous bulb, results in the soaking and killing of highly wettable, hydrophilic pathogenic material. Sterilized air escapes a liquid phase and passes through a polymeric coiled tubing set of indeterminate length, however sufficient decent to dry the $H_2O_2$. The coiled tubing is coated with a hydrophilic inner surface that dries air of excess moisture via surfaces interactions with the tubing and drainage by gravity.

Decontaminated air passes through the tube and into an iodized sodium-chloride (table salt) filter calibrated to collide with the air and absorb any remaining wet particles, regardless of size, due to the ultra-hydrophilic characteristic of table salt. The air pathway cannot escape the iodinated salt. Any pre-wetted particle (hydrophilic particle; i.e.: dander or pollen) will likewise be absorbed and dissolved by the salt. After the salt filter, air traverses through a standard HEPA filter (0.3 microns) and is directly supplied into a breathing apparatus facial contact mask that snuggly covers the nasal and mouth area of a wearer. Any excess air or exhalant is released through filtered baffles. In another embodiment, a baffle can be configured to sterilize exhaled air or by introducing a secondary reversing module in the same arrangement. Thereby, exhalant air is moved into a bulb/globe (baffled bubbler) containing $H_2O_2$ solution, through an iodized table salt filter system and released through a baffle on the breathing apparatus facial contact mask.

A failsafe mechanism for a battery-powered pump contained in a wearable air supply/controller unit is accomplished by a wearer's individual inhalation forces, which passes air through the $H_2O_2$, albeit with more effort (labored breathing) than while a pump is running. The face mask covers a wearer's entire facial region. In a proposed embodiment, a facial region would include a wearer's mouth, nose, and eyes, with snug air-tight fittings around the chin, cheek and forehead areas however the nasal and mouth section that receives sterilized air is separate from the ocular region to prevent any screen fogging or vision impairment. The ocular shield, while subdivided from the mouth and nose region of a wearer would effectively protect a wearer's eyes from incursion of airborne aerosolized pathogens. The entire apparatus is capable of quick donning and removal to accommodate a wearer and/or specific circumstances (i.e.: a first responder retrieving a sick patient or other vile environmental conditions associated with forensics or bacteriologic contaminated conditions).

DETAILED DESCRIPTION OF THE INVENTION

Figure 1:
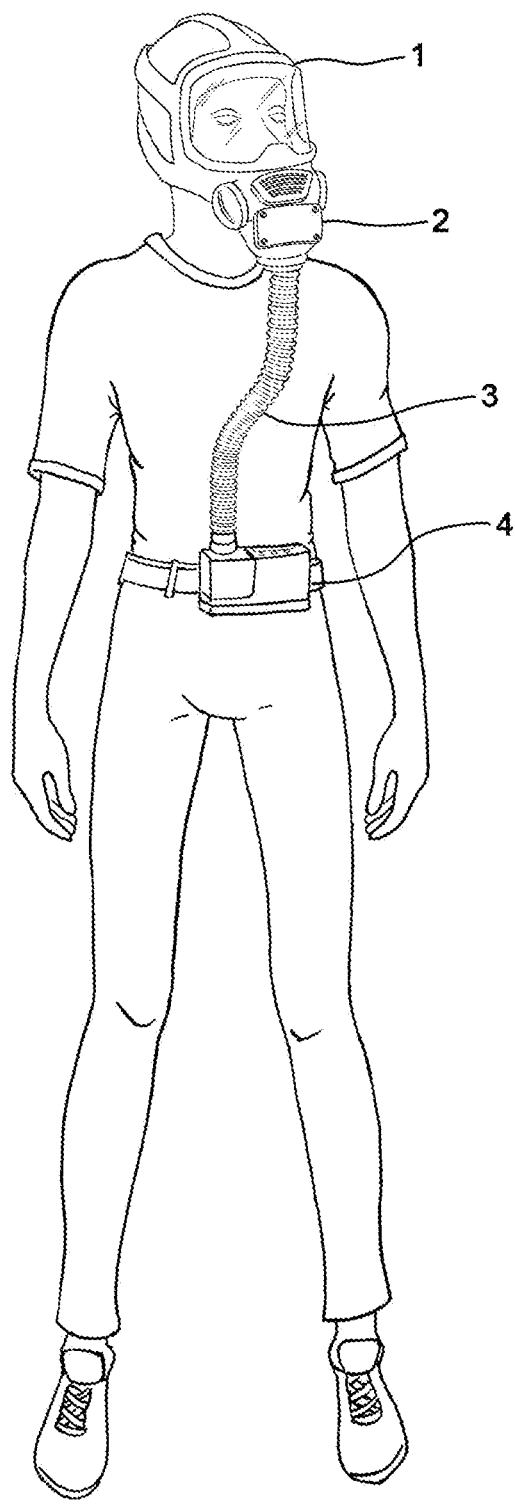
FIG. 1 illustrates a front view of the mobile breathing apparatus as worn on the face and waist of a user according to the present invention.

To overcome the drawbacks of incorporating one single active anti-pathogen layer, multiple antimicrobial arrangements are incorporated into the proposed breathing apparatus facial contact mask and air supply/controller unit to impart robust and broad-spectrum anti-viral, anti-bacterial, anti-fungal and anti-allergenic properties. During operation, disparate volumes, droplet sizes and phases (liquid, aerosolized, etc.), exposure dynamics, and pathogen types will be encountered by a user and challenged to the mask. The proposed invention utilizes a redundant mechanism of sterilization to ensure wide spectrum pathogenicity and performance with each layer or active agent providing a different method of pathogen killing.

The proposed invention is intersectional in nature, without altering biology but using bioprocess. Environment air is subjected to multiple neutralizing articles that sterilize breathable air without any residue, ancillary contamination or toxins in an inexpensive apparatus with traditional household reagents or media. Theoretically, air in a room could be appropriately sterilized by highly heating the room until steam is formed and subsequently cooled. In this approach, gas would be sterile or endotoxin free. As such, the environment air requirements for working with virulent pathogens in a highly classified Biosafety Laboratory 3 (BSL3) laboratory requires only HEPA-filtration of 0.3 microns, while many pathogens much smaller. The same holds true for the N95 respirator or ultra-filtration masks. Technically, one might need to pass air through an autoclave and cool and recirculate air to eradicate a lethal virus or bacterium especially, double walled gram-negative bacterium, however this mechanism would be overly cumbersome for portable personal protection.

For the purpose of invention, the term "pathogen" describes microorganisms including, but not limited to, bacteria, protozoa, viruses, molds, yeasts, fungi and the like. The term "antimicrobial" is intended to convey the propensity to inhibit, prevent, or destroy a pathogen, as well as preclude proliferation and growth of a microorganism.

From an infectious disease perspective, pathogens are transmitted through contagion and require a host organism to survive and prosper. Most pathogens are highly aqueous in nature and fall into the categories of aerobic and anaerobic. Scientifically, the culture and colonization of pathogens in a medium is well known and understood. Further, without a host or culture media, pathogens lack significant life sustaining properties and capabilities. Similarly, pathogens are unable to survive numerous antimicrobial processes. These processes are predominantly characterized as sterilization using either temperature and/or chemistry. However, most sterilization techniques have not been applied to a portable protective breathing apparatus due to the toxic nature of chemistries or physical nature of the mechanism (i.e.: autoclave). Most sterilization techniques are designed stationary and not easily portable. Such techniques are routinely applied in the medical device field, allowing for penetration of complex design forms (artificial knees, hips, reusable endoscopes, etc.).

Airborne pathogens can remain active and viable outside of the host, however the organisms are not shielded or protected in the gas form and are especially vulnerable. These lightweight particles or microbes can linger or float in the air for different periods of time, largely dictated by temperature and humidity. These characteristics of a pathogen enable airborne transmission, however their vulnerability outside of the hosts represents an opportunistic method for elimination with a bioactive air sterilization apparatus or respiratory device.

The proposed invention would meet the objective of air sterilization by manipulating the aqueous life form state (and affinities therein) of pathogens to kill and render an infectious agent harmless and carry air that is safe for breathing.

Figure 2:
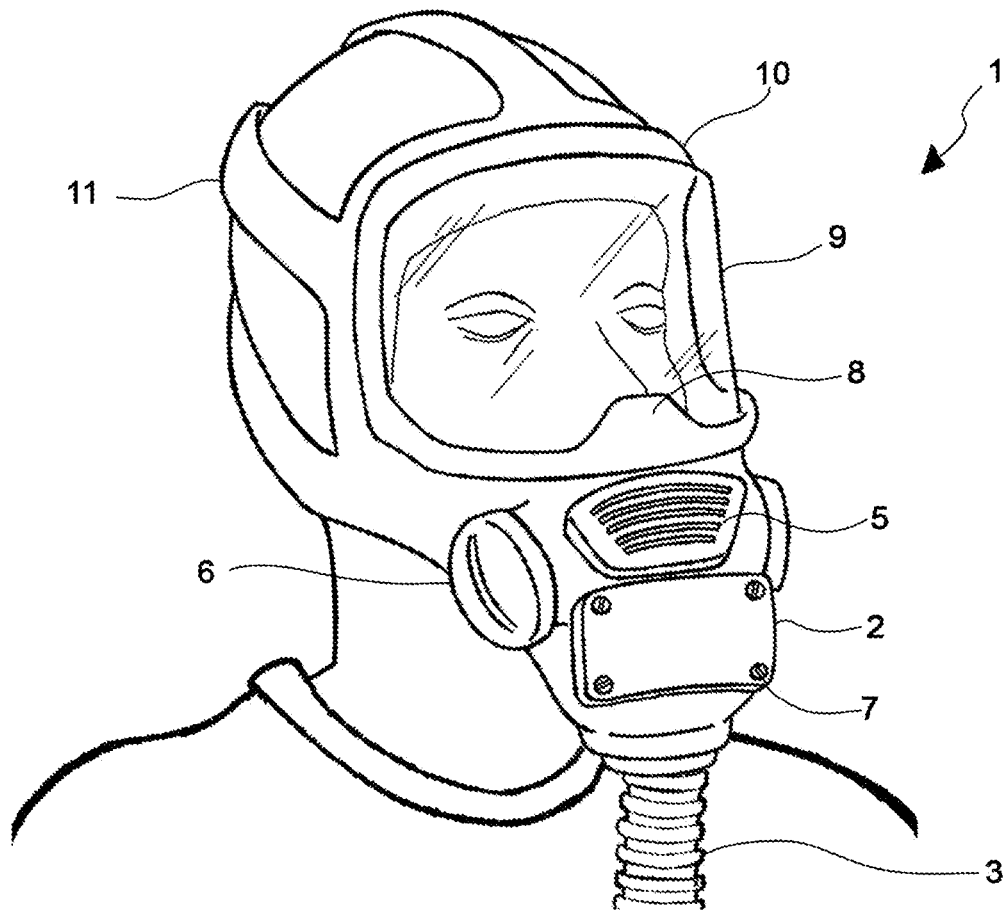
FIG. 2 illustrates a perspective view of the mobile breathing apparatus facial contact mask.
Figure 3:
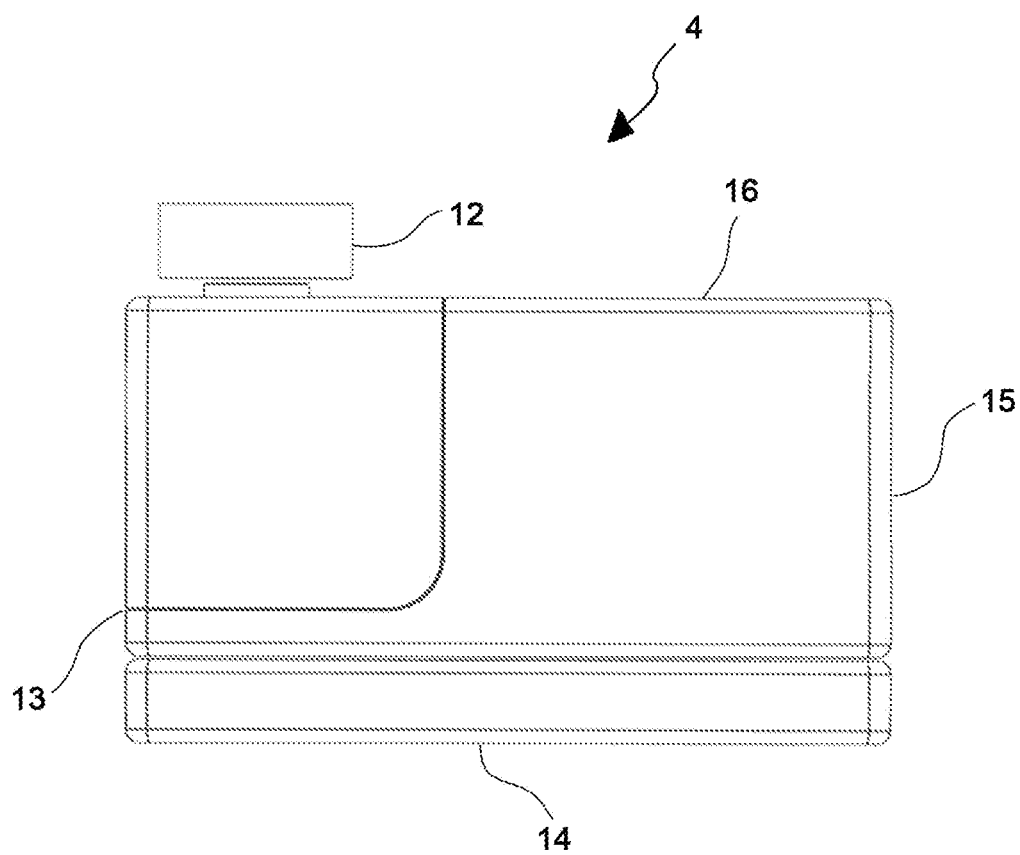
FIG. 3 illustrates a front elevation view of the air supply/controller unit.

FIGS. 1-2 illustrates one embodiment of a mobile breathing apparatus with an air supply/controller unit worn on a user's waist and a breathing apparatus facial contact mask fitted and enclosed on the face of a user. FIGS. 3-7 include perspective and section views of the invention components following the flow of air through the pathway from an intake filter to a user respiratory system delivery.

The pathway is defined accordingly: environmental air enters an environmental air supply/controller unit 4 through an intake filter and air pump 26 connected to a rechargeable battery 24, an elbow pathway and bulb (±50 cc bulb and ±25 cc liquid) 18 filled with ±10% $H_2O_2$ 30 (fill ports and drains) is connected to a sufficiently long (~2 feet) flexible tubing 3 containing a polymeric coiled tubing with inner wall coating of ultra-hydrophilic paint for moisture collection and drainage 28 connects to a replaceable, cleanable (to scatter air) 3-stage filter article 2 containing an iodized sodium chloride salt filter layer 34 and a water separation media 35 and HEPA filter 37. A replaceable, cleanable 3-stage filter article is attached to a breathing apparatus facial contact mask with four knurled panel screws 7. External air is passed through the $H_2O_2$, polymeric tubing and replaceable, cleanable 3-stage filter article to the sealed breathing apparatus facial contact mask (covering the eyes and mouth area) 1, and excess or exhaled air escapes through air filtered one-way baffles 6 or vents 5.

First, in the preferred embodiment of the invention external environmental air is drawn into the air supply/controller unit's intake 26 via an oscillating propeller, technically an impeller or meshing impeller 25. The air supply/controller unit can be worn as a tunic under or outer the clothing of a wearer on the back front or side. The battery-powered air supply/controller unit 4 can be attached to a wearer's beltline, back/shoulders, chest, or many different options. The airflow intake is calibrated to exceed oxygen/air breathing needs by 100% and capable of easy adjustments through the air supply/controller unit's user interface 16 mounted on the top of the air supply/controller unit. Pumped sterile air and breathing process is unlabored and natural although air movement around the face of a wearer is notable. In the event of a battery discharge or other pump failure, the ability to inhale air is unimpaired but requires physical inhalation by a wearer, however this failsafe process results in a more unnatural process. Wearable battery technology has been defined historically, dating several decades with the VAD (ventricular assist devices). These devices provide heart pumping assistant by mechanical means and are powered by an external battery. Next generation batteries used to support LVADs may last between 12 and 17 hours on a single charge, however, the proposed pumping electrical demand of the air supply/controller unit is significantly smaller, and durations of 24 to 36 hours is easily achievable.

In the illustrated embodiment of the invention, a durable polymer housing 15 would contain a rechargeable lithium polymer battery 24 located in the lower casing 14 of the air supply/controller unit 4. The battery would be charged using widely available Universal Serial Bus (USB) 3.0 or 3.1 port 22 on a battery controller 23, allowing for rapid 5-20 volt charging at 500 milliamps to 5 amperes. USB specification aligns with current cellular phone charging and the ubiquitous nature of the technology would allow for convenient charging at home or while traveling. A user may also opt for additional rechargeable battery "tanks" that are widely available on the market and would allow for extended operation of the breathing device.

Figure 4:
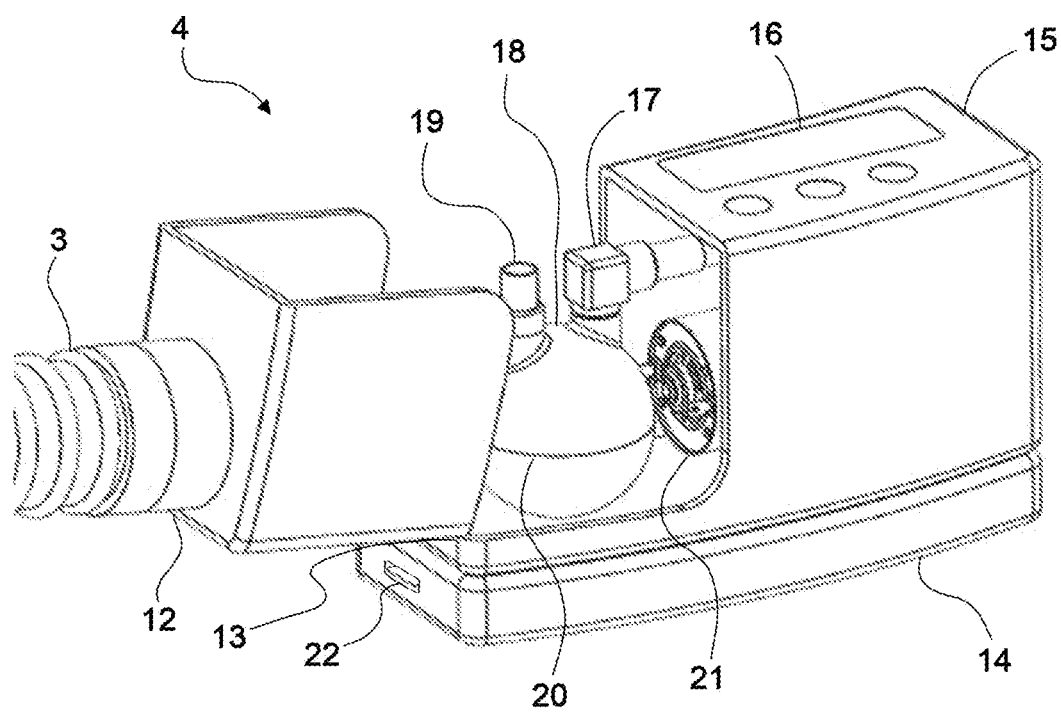
FIG. 4 is a perspective view of the air supply/controller unit and illustrates a user accessible portion of the invention.
Figure 5:
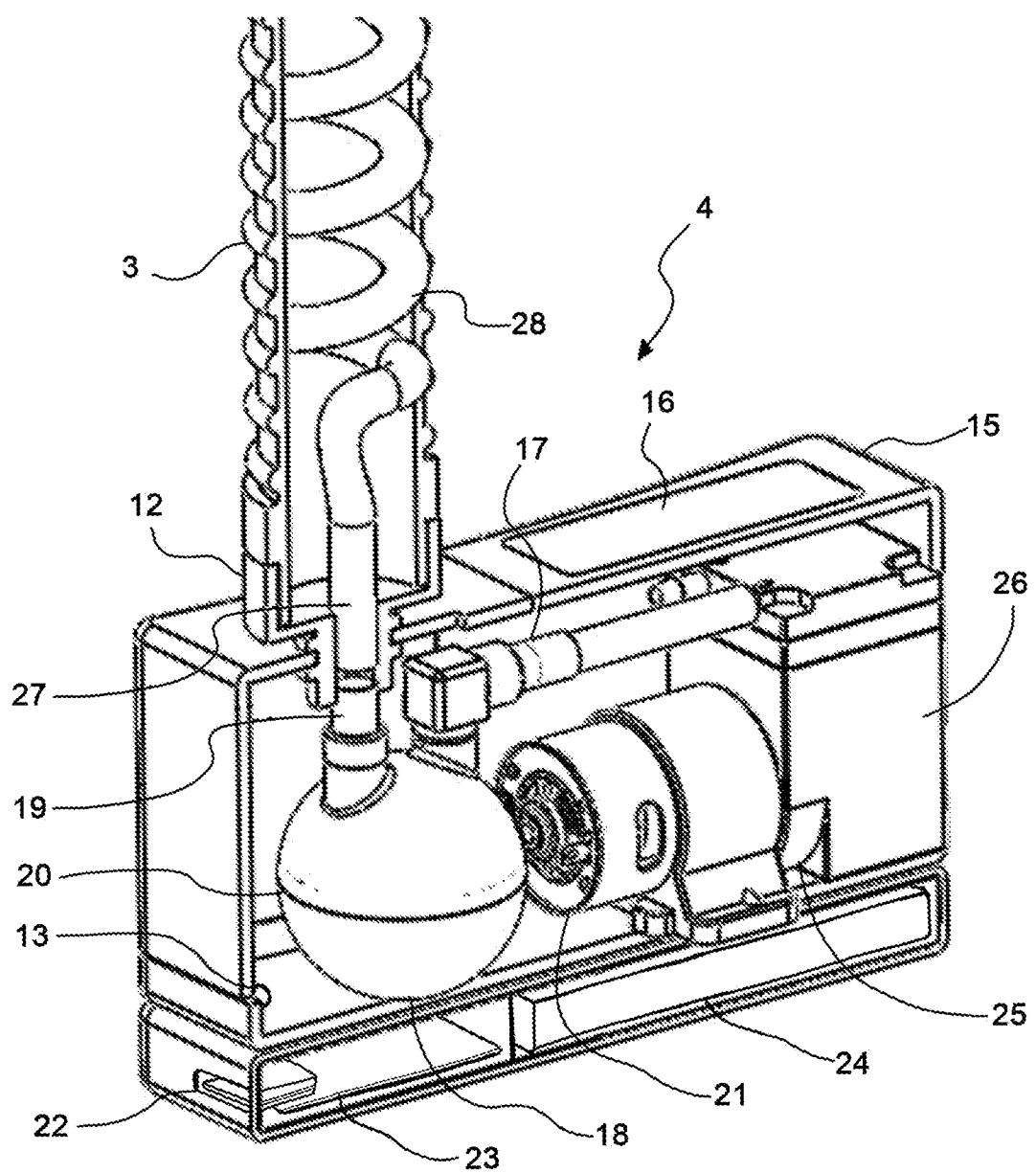
FIG. 5 is a perspective cut-away view of the air supply/controller unit.
Figure 6:
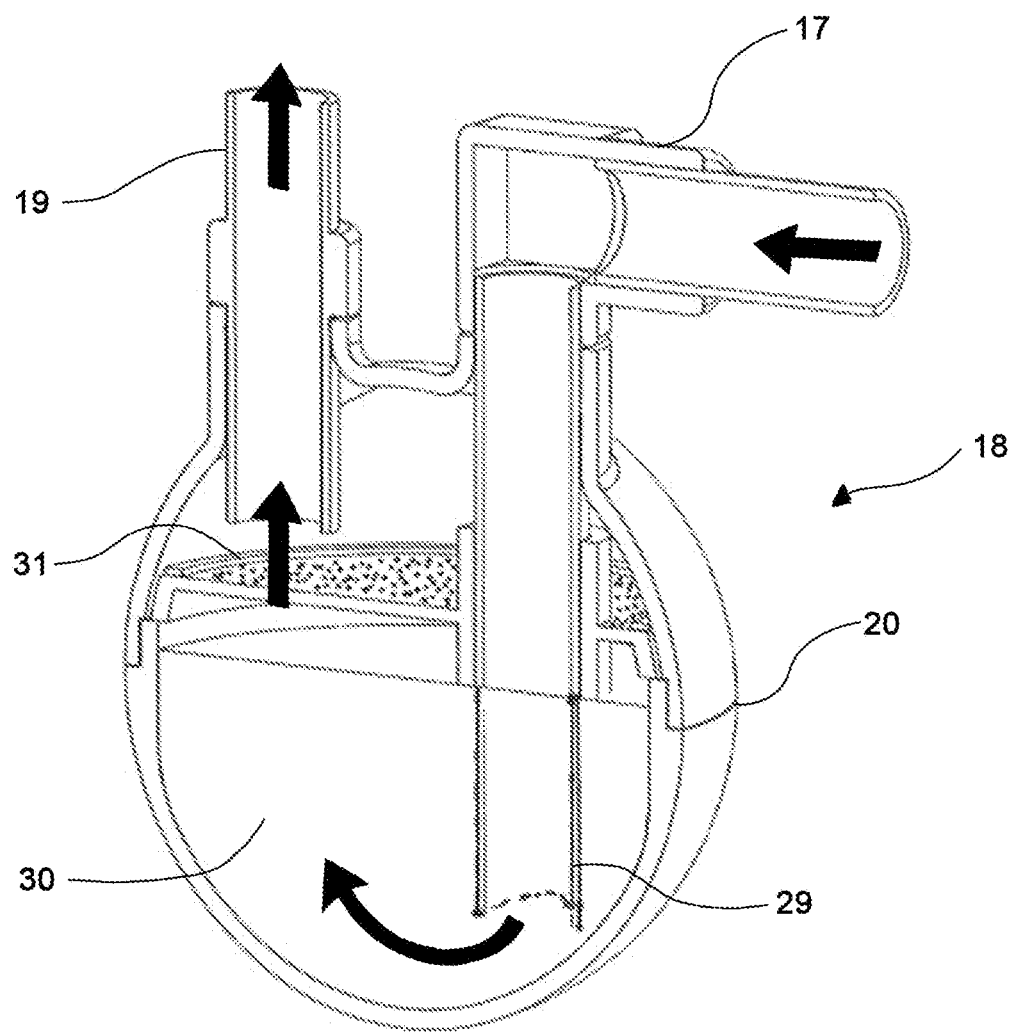
FIG. 6 is a cut-away detail view of the 50 cc bulb of FIG. 4.
Figure 7:
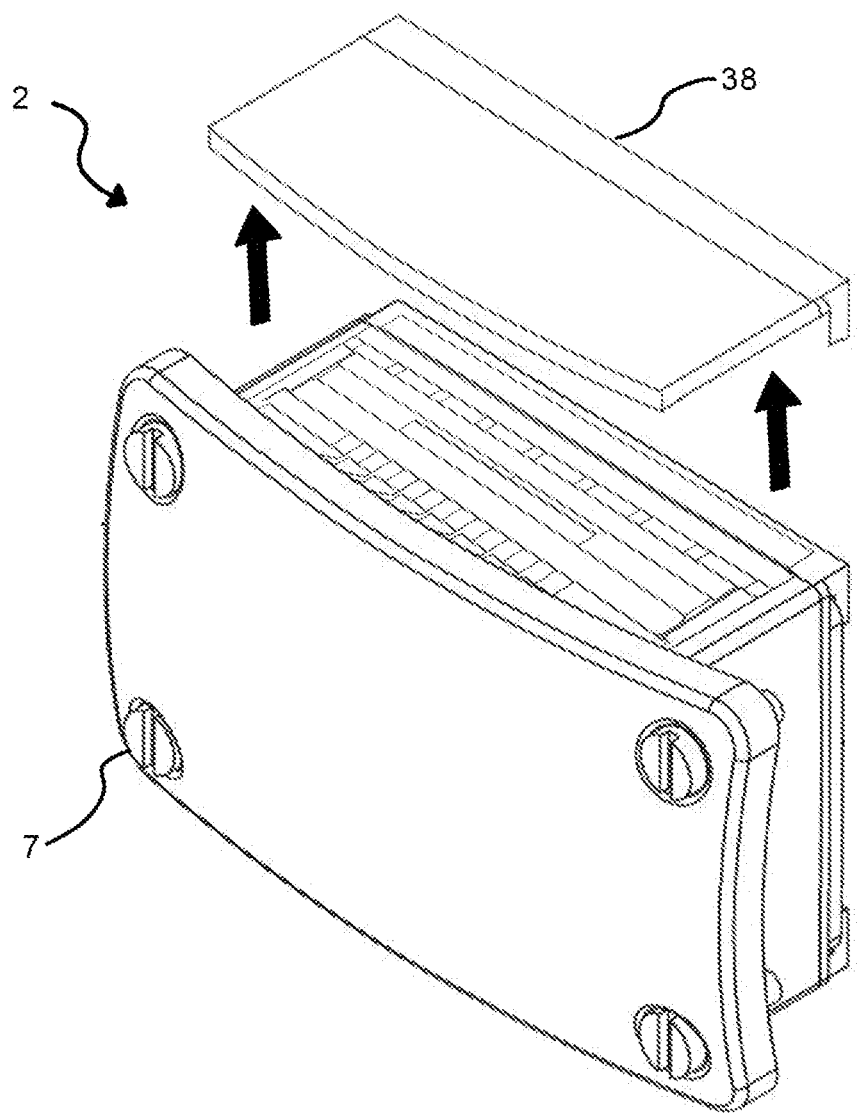
FIG. 7 is a perspective view of the user removable filter module from the facial contact mask of FIG. 2.

A controlled supply of air is taken into the air supply/controller unit by mechanical pumping means 21 into the air supply/controller unit and is forced through a tubing 17 into a ±50 cc globe or bulb 18 via a submerged outlet 29 into a volume (25-50%) of $H_2O_2$ (5-10%) 30. The $H_2O_2$ liquid 30 containing bulb (baffled bubbler) 18 uses an aeration technique to break the air molecules into tiny, unstable, bouncing bubbles that contact and interact with the $H_2O_2$ liquid 30. The passage of air through the bulb system is indicated in FIG. 6, as indicated by the arrows. The bulb 18 can be easily accessed by a user via convenient opening and hinge 13 for $H_2O_2$ 30 replacement as illustrated in FIG. 4. The user can remove and refill $H_2O_2$ 30 via an airway exit port 19 of the bulb 18. A clear fill line 20 will indicate the appropriate level so a user can easily fill to an appropriate volume without measuring and allowing for optimal operation of the device.

Accordingly, the H2O2 30 acts as a sterilant with pathogenic matter or as a wetting agent to hydrophilic allergens. These highly wettable, hydrophilic pathogens contained in environmental air are soaked and killed by the combination of the aeration mechanics and the mixing in a vacuous bulb 18 containing H2O2 30. H2O2 in a household diluted form is at a 3% concentration and used to disinfect wounds. Lower concentrated forms of H2O2 (1.5-2%) are routinely added into mouthwashes and other oral hygiene and teeth whitening products. Concentrated H2O2 (6-10%) is commonly sold over the counter for hair dying applications and will bleach dark skin spots lighter by disrupting intracellular protections and causes caustic disruption to tissue. At 10% the caustic effect is more remarkable. According to the EPA, H2O2 at a drinkable concentration of 0.5% kills coronavirus. A H2O2, concentration of 5% will eradicate the most prevalent endotoxin, lipopolysaccharides (LPS), which is virtually indestructible except by very high heat. Technically, concentrations of 5% to 10% H2O2 would be lethal to broad-spectrum pathogens assuming the organism is wetted or bathed by the chemistry.

Sterilized air escapes the $H_2O_2$ 30 and passes through an atomizer 31 and into a flexible tube 27 at the base of a polymeric coiled tubing set 28 coated with a hydrophilic inner surface that dries the air of excess moisture simply due to the surface physics (and drainage by gravity). The polymeric coiled tubing set 28 is contained within a flexible tubing 3 that is attached to connection point/disconnect 12 on the air supply/controller unit 4 and extends to breathing apparatus facial contact mask 1.

Figure 8:
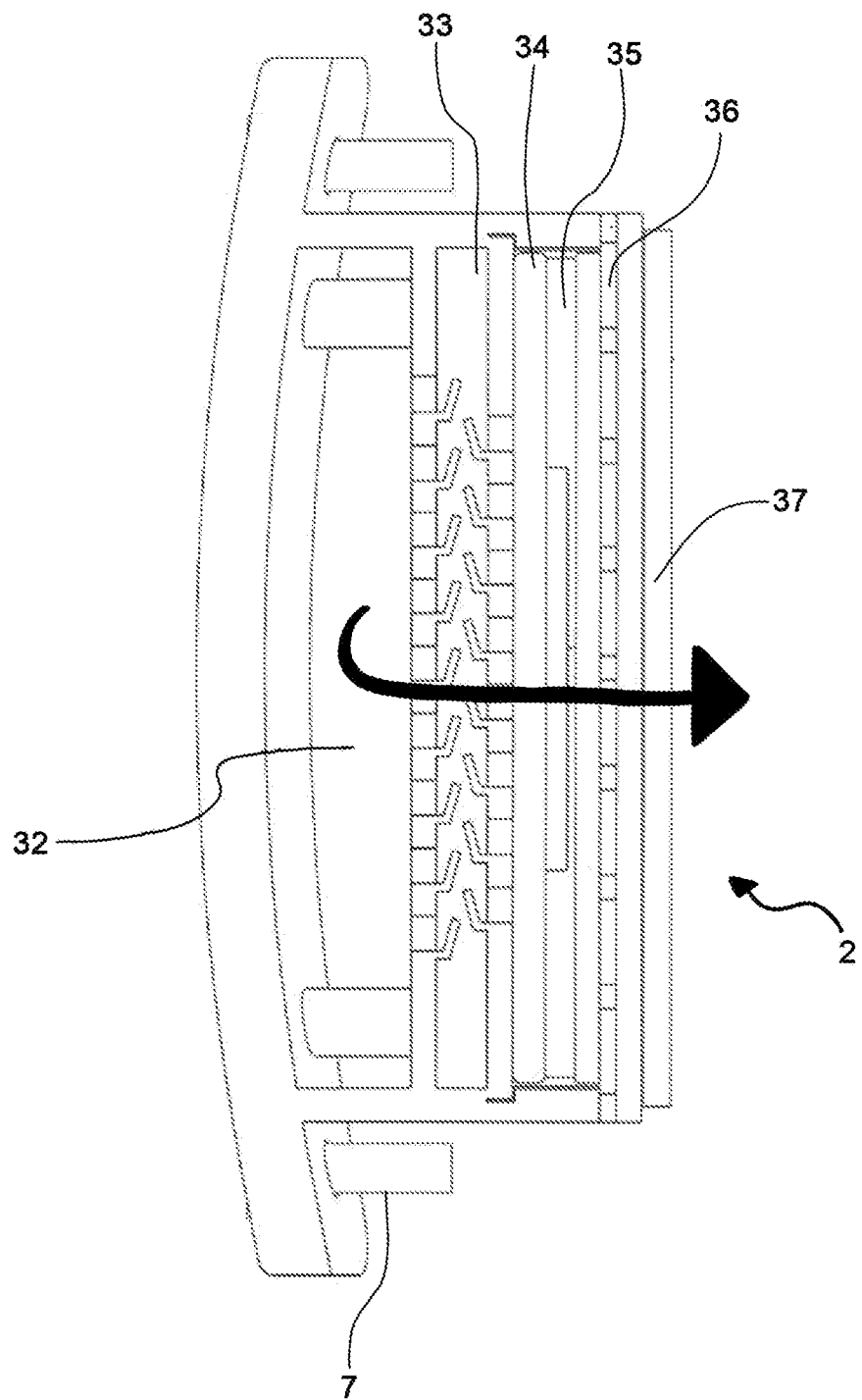
FIG. 8 is a plan view of the removable filter module and air flow of FIG. 7.
Figure 9:
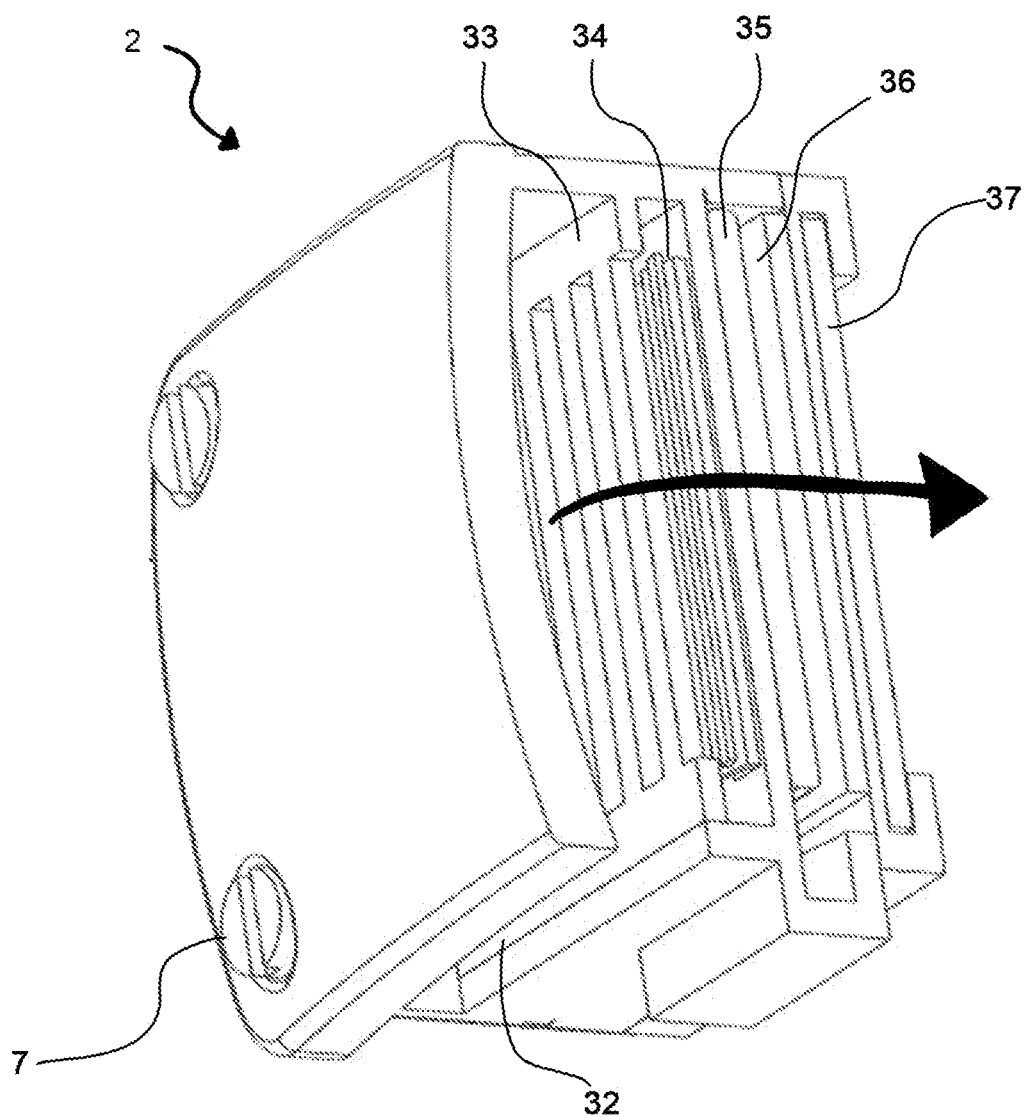
FIG. 9 is an end sectional view of the removable filter module and air flow of FIG. 7.
Figure 10:
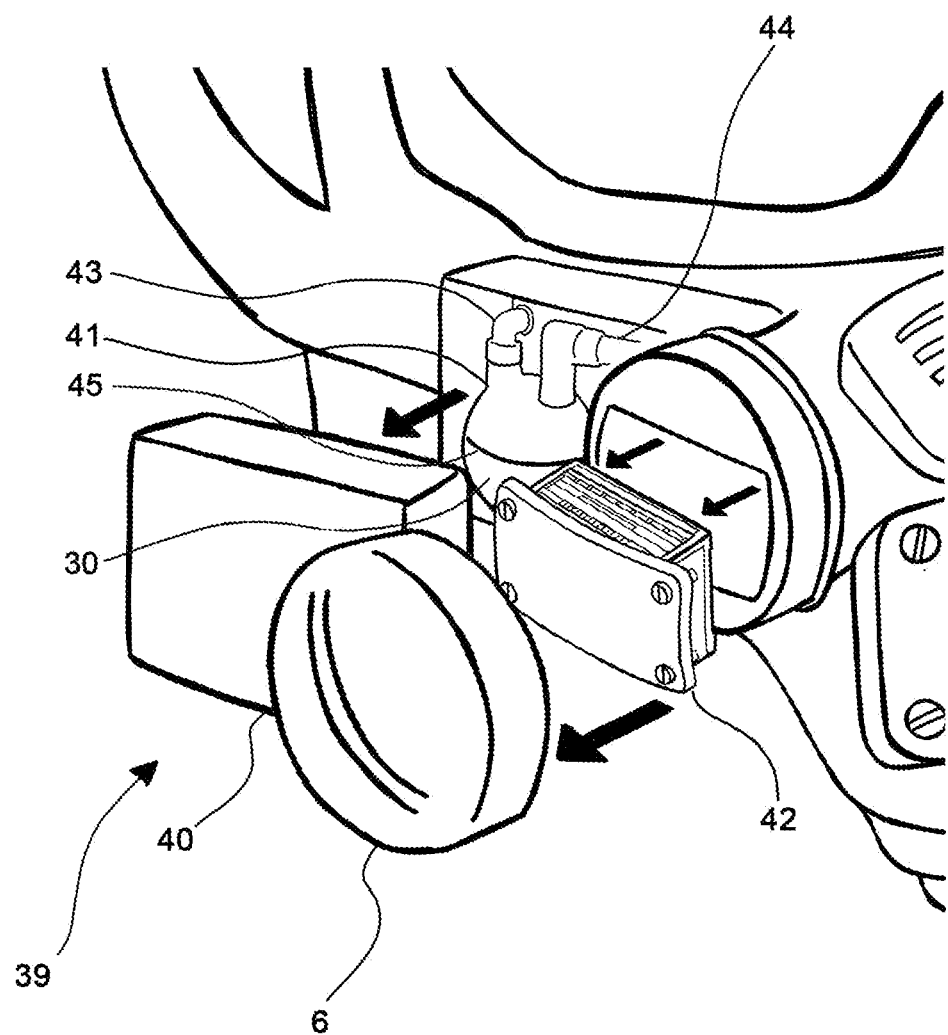
FIG. 10 is a perspective view of the mobile breathing apparatus facial contact mask of FIG. 2 and illustrates a user accessible portion of the invention.

Next, air enters the replaceable, cleanable 3-stage filter article 2 through an air inlet 32 and flows through a distal baffling network 33 and into an iodized sodium chloride salt filter 34 calibrated to collide with the air and absorb any remaining wet particles due to the ultra-hydrophilic characteristic of salt. The flow of air through the replaceable, cleanable 3-stage filter article 2 is indicated by the arrows in FIGS. 8 and 9. In this embodiment the use of iodized table salt acts as a secondary mechanism to kill an unprotected airborne pathogen. Iodine works at extremely low concentration and can kill broad-spectrum pathogens on contact. Iodine is a nonmetallic element forming black crystals and a violet vapor and from the family of halogens. Iodine is a key material used for surgery site skin sterilization and surgeon hand washing when mixed with soap. A relatively benign household form of iodine is iodized salt and is food grade. Further, a highly iodized salt is ultra-hydrophilic and instantly lethal to aqueous pathogens. Water molecules have a powerful viscosity (on the atomic level) and move together in droplets and resists separation. An aqueous pathogen is instantly adsorbed into salt and once the liquid evaporates, all that remains is the pathogen and the crystallized salt—which slices through the pathogen, neutralizing it, by both the caustic aspects of sodium chloride and by the further caustic characteristics of iodine. It is important to note that a pathogen is dependent on the water content and salt has a natural affinity to the water carrying and contained in the organism. Biologically, a host organism recognizes the pathogen as non-human antigenic or as foreign body, however environmentally, a pathogen is only water to contact materials that are hydrophilic. In addition to the antimicrobial capacity of the iodized salt 34 contained in the replaceable, cleanable 3-stage filter article 2, this iodized salt layer 34 also services as a mild and safe desiccant to further remove any moisture from incoming air supply that passes through the $H_2O_2$ 30 containing globe 18. Salt is considered a safe and affordable desiccant material without being overtly extractive to the relative moisture levels in the sterilized air. The salt-based desiccant would be calibrated to enable the transport of moderately moist air to a user. Incoming air from the breathing apparatus facial contact mask 1 would be slightly reduced from environmental levels (~50%), however still suitable for extended durations of uninterrupted use, as the breathing apparatus facial contact mask and air supply/controller unit would not perform any remarkable dehumidification processes.

The air pathway cannot escape the iodized salt layer 34 of the replaceable, cleanable 3-stage filter article 2 and any wetted particle (hydrophilic particle) like dander or pollen will likewise be adsorbed and dissolved by the iodized salt layer 34 contained in the replaceable, cleanable 3-stage article 2. As a failsafe, a postliminary water separation media 35 captures any excess moisture in the air. Next, sterilized air is moved through a proximal baffling network 36 and subsequent HEPA filter (0.3 microns) 37 that feeds directly into the breathing apparatus facial contact mask 1 that covers a wearer's entire face, snuggly. Excess air is released through filtered baffles 6 which can also be configured to sterilize exhaled air in a reverse order as described for the incoming air. Alternatively, another embodiment that functions by introducing module or adding a second module, behaving precisely as the intake air to sterilize any outgoing air.

A secondary replaceable, cleanable 3-stage filter article 42 allows for user access via a removable covering 38 located on the upper portion of the base. Removal of a replaceable, cleanable 3-stage filter article covering 38 is shown by the arrows in FIG. 7. Once removed, a user can remove and replace the iodized sodium chloride salt layer 34 and the HEPA filter 37 at preferred or recommended intervals. A removable covering 38 can be easily snapped back into place to create an airtight seal within the replaceable, cleanable 3-stage filter article 2.

While the mask 1 covers the entire facial region of a wearer, air is only introduced to the mouth and nasal region. ocular shield 9 is sealed off around the bridge of the nose 8 and forehead 10 to prevent any screen fogging or reductions to visibility. In another embodiment, a fan or anti-fog material may be applied to the ocular region to reduce any visual impairments. The entire mask is tightly held and positioned on the head of the user with a synthetic polymer strap 11.

After use of the protective face mask 1 and once in a suitable environment the entire system is easily disassembled by a user and sterilized at home or workplace. A storage box equipped with full aluminum mirror surface coverage and a high intensity ultraviolet (UV) light lamp at every right angle/box fold (12 lamps). The entire unit is place into the center of the box (drained of $H_2O_2$ and salt) and the equipment floats at the center of the box for full UV sterilization. This is accomplished by an aluminum wire X-frame in the middle of the box and the unit is simply placed inside on the wire frame. Within two hours the entire unit is sterilized and dry and can be stored in a two-gallon zip lock bag or disposable plastic bag.

Finally, the proposed antimicrobial mechanism of benign household chemistry, $H_2O_2$ and iodized sodium chloride, in combination with the air intake and processing method as proposed in this invention could be similarly scaled in a manner to accommodate general environmental air sterilization. In such additional embodiments, a sealed environment, irrespective of size, could adapt the proposed sterilization methods. Such environments include, but are not limited to, cruise vessels, aircrafts, nurseries, hospitals, gymnasiums, warehouses, submarines, universities, or another characteristically sealed environment/space.

The present invention relates to a protective face mask and filtration article, a method for using a protective face mask and filtration article, and a design for manufacturing. In particular, the invention relates to a self-contained, mobile, battery-powered bioactive and filtering breathing appliance that provides broad spectrum antimicrobial and allergic protection via an atomized biocidal agent steam/vapor and a torturous hydrophilic filtration article that sterilizes incoming air and captures debris. To this end, antimicrobial activity and filtration functions leverage a redundancy of means/methods comprised of antimicrobial hydrogen peroxide liquid/vapor/steam and an iodized salt containing hydrophilic filtration article. Current art, such as surgical masks and respirators, can fail to provide adequate filtration, lack microbiocidal capabilities, and can create belabored breathing patterns to a wearer. Additionally, the single-use nature of disposable masks create waste. The present invention is a reusable wearable apparatus that sterilizes incoming air by capturing, neutralizing and destroying airborne pathogens and other particulate matter and pumps sterilized oxygen/air for natural, unlabored breathing by a wearer utilizing safe, affordable, and accessible household chemistries, iodized sodium chloride (common table salt) and hydrogen peroxide that is configured in a dual-stage antimicrobial portable facial contact mask and device apparatus. The present invention further relates to a production method thereof. It should be appreciated that numerous departures from the specifics of this disclosure described and illustrated herein can be made by those reasonably skilled in the art without departing from the scope and spirit of the invention.

The invention claimed is:

1. A facial contact mask structure that covers a wearer's mouth and nose region, has a separated ocular shield, and an environmental air supply/controller unit for inactivating pathogens from incoming environmental air comprising:

(a) wherein the facial contact mask structure is able to be affixed to a wearer to tightly cover an entire face region while in use;

(b) wherein the environmental air supply/controller unit is battery powered and that is adapted to be affixed to a wearer in use and accepts environmental air through a motor and passes external air through a tubing and into a glass bulb containing a 3%-10% hydrogen peroxide solution that wets incoming particles and deactivates and kills pathogenic material while in use;

(c) a flexible polymeric coiled tubing set that has interior wall surfaces coated with an ultra-hydrophilic paint or material that dries excessive moisture via surfaces interactions with the interior tube coating and subsequent drainage by gravity and is connected to a replaceable or cleanable three stage filter article on the facial contact mask structure or the air supply/controller unit on an outlet of the contained glass bulb; and (d) a replaceable or cleanable three stage filter article that is comprised of iodized table salt as a hydrophilic and sterilizing layer, a water separation layer, and final particulate filtration layer that scrubs incoming air of pathogenic material.

2. The facial contact mask structure and environmental air supply/controller unit for inactivating pathogens from incoming environmental air of claim 1, wherein the facial contact mask structure is subdivided and adapted to surround and cover the wearer's mouth, nose, and eye regions and, while in use, delivers sterilized air to the wearer's mouth and nose region through a breathing circuit that intakes environmental air through the air supply/controller unit, into the glass bulb containing 3%-10% hydrogen peroxide solution, through a flexible hydrophilic coated interior of the tubing set, and into the replaceable and cleanable three stage filter comprised of an iodized table salt layer, a water separation layer and a particle filtration layer.

3. The facial contact mask structure and environmental air supply/controller unit for inactivating pathogens from incoming environmental air of claim 1 further configured to sterilize exhalant air.

4. The facial contact mask structure and environmental air supply/controller unit for inactivating pathogens from incoming environmental air of claim 1, wherein when the environmental air supply/controller unit is not attached to the facial mask structure, the environmental air supply/controller unit can be used to sterilize air in a sealed environment that is large enough for occupancy by a person by attaching the system to an air handling unit.

* * * * *